United States Patent

Vaccaro et al.

[11] Patent Number: 6,061,017
[45] Date of Patent: May 9, 2000

[54] SYSTEM FOR INCREASING ISOLATION IN ACTIVE RADAR AUGMENTATION SYSTEMS

[75] Inventors: Kenneth Vaccaro, Camarillo; Kenneth Oh, Thousand Oaks; Dean Lucian Mensa, Ventura, all of Calif.

[73] Assignee: The United States of America as represented by the Secretary of the Navy, Washington, D.C.

[21] Appl. No.: 09/084,051

[22] Filed: May 22, 1998

[51] Int. Cl.[7] .................................................... G01S 13/74
[52] U.S. Cl. ............................................ 342/187; 342/175
[58] Field of Search ............................ 342/5, 6, 13, 175, 342/187, 195

[56] References Cited

U.S. PATENT DOCUMENTS

| | | | |
|---|---|---|---|
| 4,017,856 | 4/1977 | Wiegand | 342/187 X |
| 4,037,228 | 7/1977 | Pearson | 342/7 |
| 4,178,596 | 12/1979 | Rowlett | 342/187 |
| 4,612,543 | 9/1986 | Devries | 342/187 |

*Primary Examiner*—Bernarr E. Gregory
*Attorney, Agent, or Firm*—David Kalmbaugh

[57] ABSTRACT

In an active radar augmentation system a microwave switch is connected between the receiving antenna and the amplifier. When there is an RF input signal to the receiving antenna of the augmentation system, a square wave timing signal provided to the microwave switch is adjusted to have the microwave switch in an open state during a time period when the coupling or feedback signal from the transmitting antenna of the augmentation system is received by the receiving antenna. The "on-off" timing of the square wave signal is set equal to the external time delay of the feedback signal plus the internal time delay of the RF signal as the RF signal passes through the augmentation system. Under this condition, the feedback signal coupled by antenna leakage arrives at the output of the receiving antenna while the microwave switch is in the open state.

7 Claims, 4 Drawing Sheets

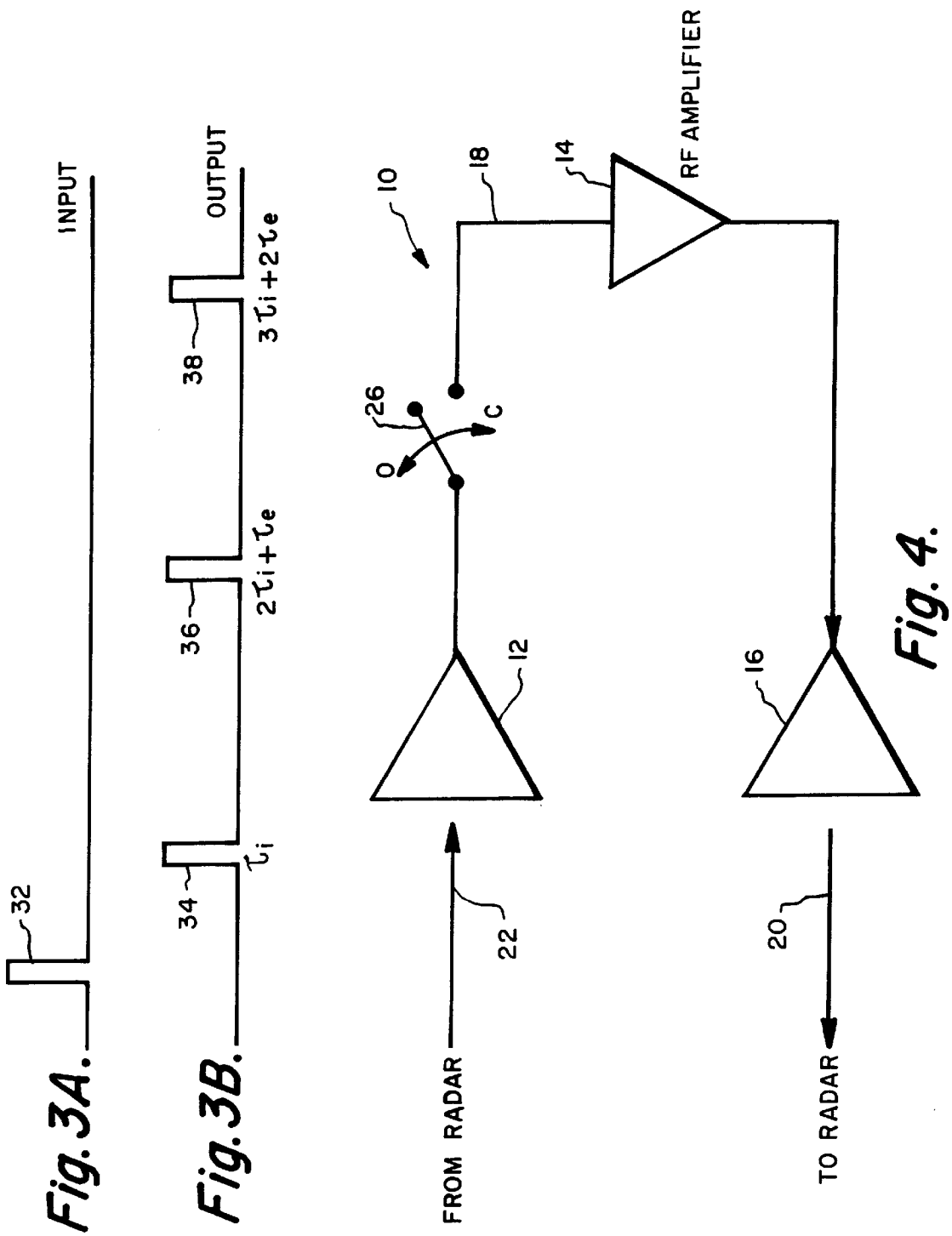

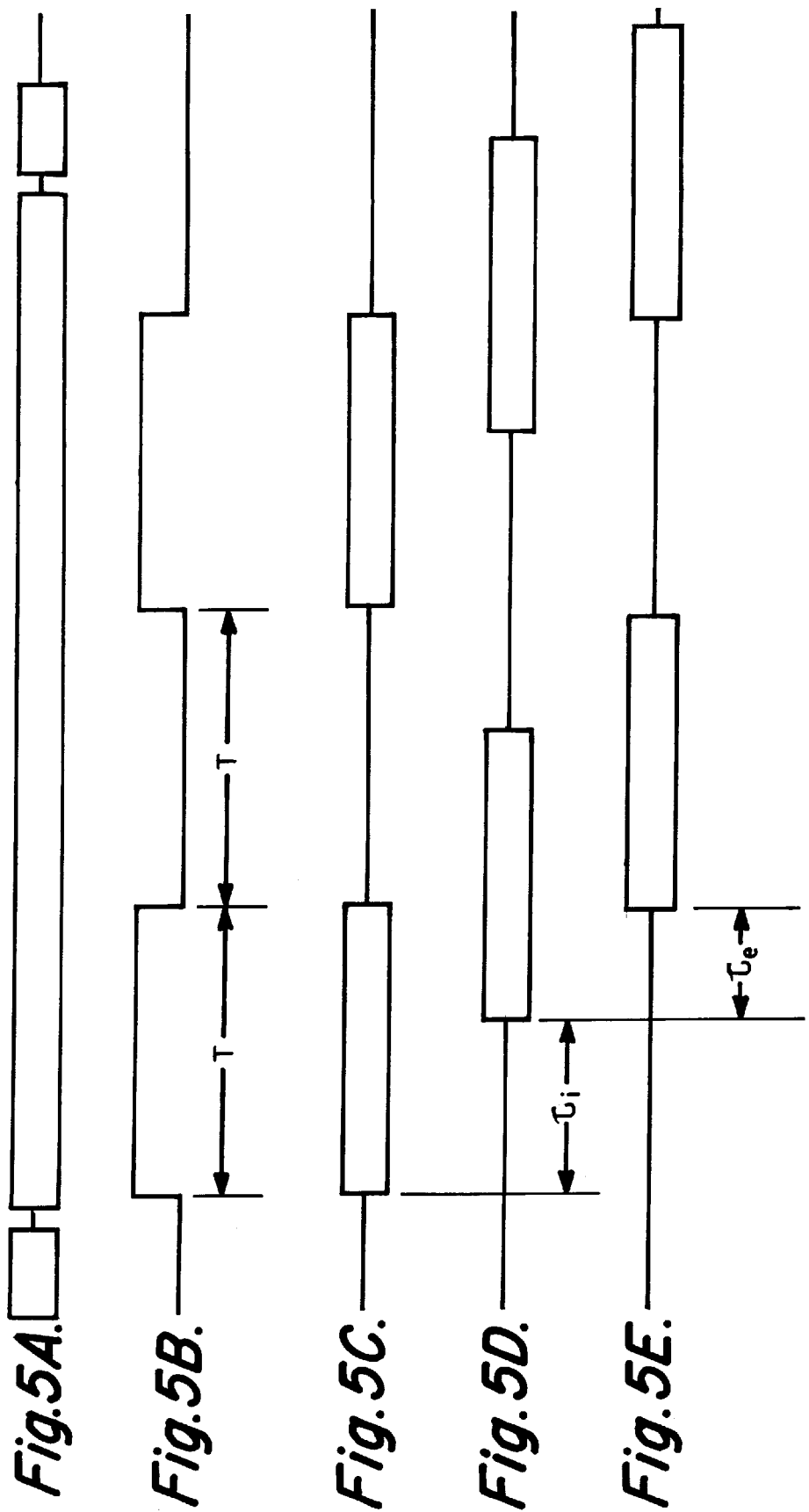

SYSTEM FOR INCREASING ISOLATION IN ACTIVE RADAR AUGMENTATION SYSTEMS

BACKGROUND OF THE INVENTION

1. Field of the Invention

The present invention relates generally to radar augmentation systems for use with airborne targets. More particularly, the present invention relates to a system for maximizing the usable gain of the augmentation system of an airborne target and thus its effective echo strength by increasing isolation in the target's radar augmentation system.

2. Description of the Prior Art

Airborne targets are in wide use for evaluation of missile performance and for training of firing crews. Since the objective is to hit the target, more direct hits mean greater target losses. In order to decrease these losses, unpowered targets have been towed behind a piloted aircraft or a drone aircraft, and inexpensive powered targets have been launched from a carrier aircraft. Also, targets are built to be recovered and re-used.

In the case of targets for missiles guided by radar, the target may be made with minimum size and construction cost, and be equipped with radar augmentation which produces the desired radar return signal to simulate a large target, thus allowing the missile guidance system track on the target.

There are both passive and active radar augmentation systems. A passive augmentation system may be, for example, a Lundberg lens which is commonly used in the nose of a target to reflect an augmented radar return signal.

Active radar augmentation systems generally consist of linear repeaters which receive, amplify, and re-radiate a captured signal back to the radar emitting the signal to increase the apparent strength of the radar echo. The radar observing the target carrying the augmentation system perceives a radar echo significantly stronger than the target echo, thus emulating a larger target.

An example of an active radar augmentation system may be found in U.S. Pat. No. 4,178,596 to Robert P. Rowlett. The system disclosed in U.S. Pat. No. 4,178,596 comprises a transmitting antenna located at the rear of a target which has a wide angle forward directional pattern. There is also a receiving antenna located in the forward portion of the target and an amplifier which is connected between the antennas.

It is desirable to have high gain RF amplifiers in active radar augmentation system to produce the desired radar return signal making a missile's guidance system track the target. While RF amplifiers with high gain are commercially available, the usable gain is limited by the isolation between transmitting and receiving antennas, which are typically in close proximity due to the physical constraints of the target. The coupling between antennas provides a feedback path whereby the signal transmitted by the augmentation system is captured by the augmentation system's receiving antenna, amplified and re-radiated, along with the desired radar signal component. The undesired signal resulting from the finite antenna isolation recirculates through the system and will generally result in regenerative oscillations which can negate the effectiveness of the radar augmentation system.

The limited gain allowable in compact augmentation systems having intrinsically low antenna isolation limits the maximum radar cross section that can be achieved. A number of techniques using cross-polarized antennas, baffles of metal and radar absorbing materials interposed between receiving and transmitting antennas have met with minor success. In the prior art, radar cross section values in excess of 10 m$^2$ have been difficult to achieve as a result of the limited degree of antenna isolation. It is desired, however, that a compact self-contained augmentation system be capable of providing 100 m$^2$ radar cross section at X-band frequencies for airborne and seaborne targets.

Accordingly, there is a need to increase antenna isolation in active radar augmentation systems to prevent regenerative oscillations within the system and provide adequate radar cross section for airborne and seaborne targets.

SUMMARY OF THE INVENTION

The present invention overcomes some of the disadvantages of the prior art including those mentioned above in that it comprises a relatively simple yet highly effective system for increasing isolation in active radar augmentation systems. In an active radar augmentation system, a microwave switch is connected between the receiving antenna and the amplifier.

When there is an RF input signal from a missile's guidance system to the receiving antenna of the augmentation system, a square wave timing signal provided to the microwave switch is adjusted to have the microwave switch in an open state during a time period when the coupling or feedback signal from the transmitting antenna of the augmentation system is received by the receiving antenna. The "on-off" timing of the square wave signal is set equal to the external time delay $\tau_e$ of the feedback signal plus the internal time delay $\tau_i$ of the RF signal as the RF signal passes through the augmentation system. Under this condition, the feedback signal coupled by antenna leakage arrives at the output of the receiving antenna while the microwave switch is in the open state.

BRIEF DESCRIPTION OF THE DRAWINGS

FIGS. 3A and 3B are timing diagram illustrating the time delay which occurs between an RF pulse input to and the RF pulse output from the system of FIG. 1;

FIG. 4 is a circuit diagram of the augmentation system of FIG. 1 which includes a microwave switch;

FIGS. 5A–5E show responses for augmentation system 10.

DETAILED DESCRIPTION OF THE PREFERRED EMBODIMENT

Figure 1:
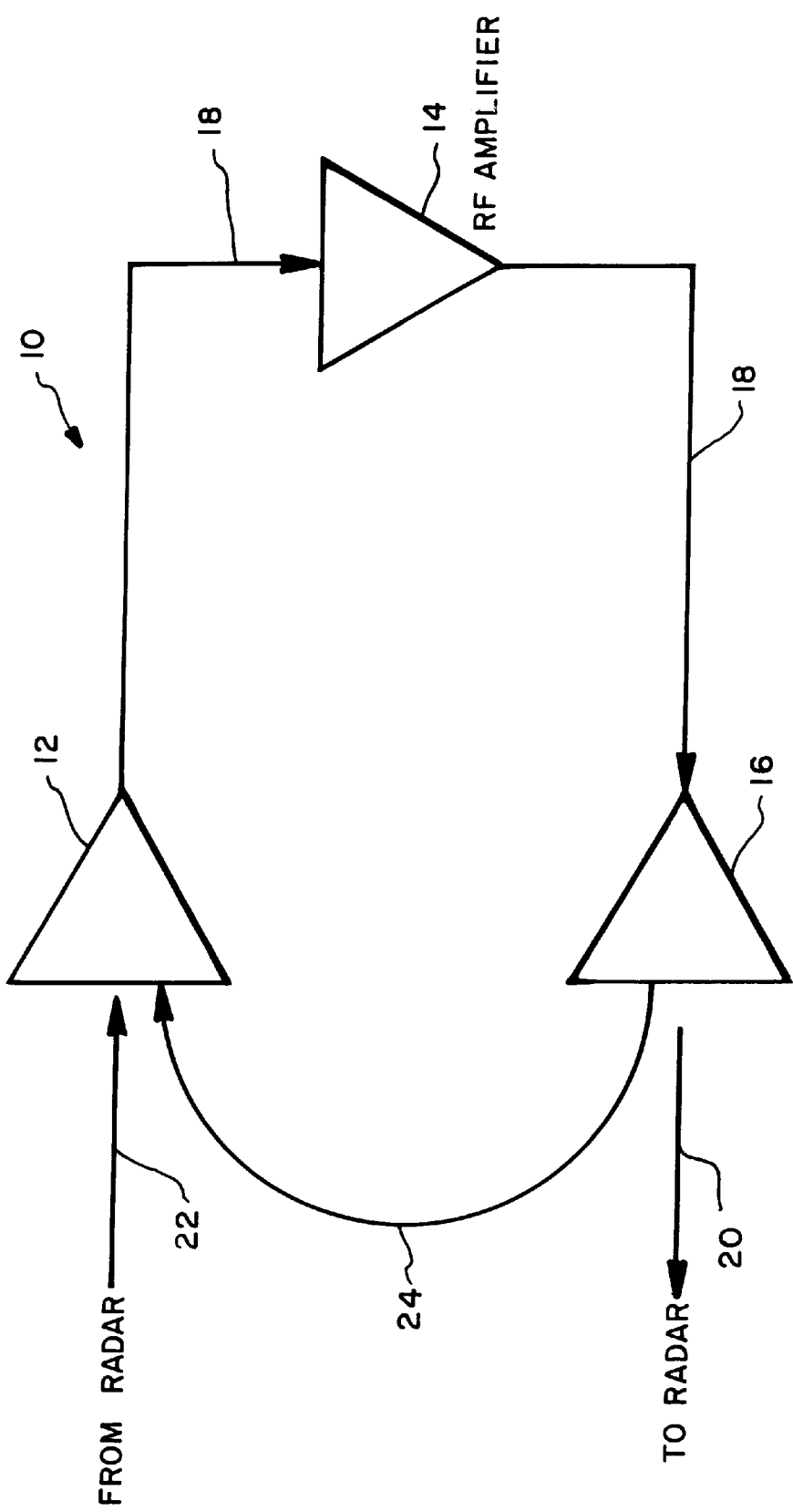
FIG. 1 is a circuit diagram illustrating an active radar augmentation system.

Referring to FIG. 1, there is shown an active radar augmentation system, designated generally by the reference numeral 10, for use in a target (not illustrated). Active radar augmentation system 10, in turn, produces a radar return signal which is used to make a missile's guidance system track a target.

Radar augmentation system 10 comprises a receiving antenna 12, an RF (radio frequency) amplifier 14, and a transmitting antenna 16 connected by RF cables 18 as shown in FIG. 1. The effective radar cross section (RCS), a measure of the echo strength, of radar augmentation system 10 is given by the following expression:

$$\sigma = \frac{G\lambda^2}{4\pi} \qquad (1)$$

where G is the system gain which is the product of the gains of amplifier 14 and antennas 12 and 16, and X is the wavelength of the RF signal (indicated by arrow 20) emitted by transmitting antenna 16.

The effective radar cross section of augmentation system 10 is proportional to the system gain, established principally by the gain of RF amplifier 14. The radar cross section of augmentation system 10 may be varied by altering the amplifier gain provided by amplifier 14. The basic function of augmentation system 10 is to increase the apparent radar cross section 10 of the host vehicle (not illustrated). This, in turn, requires that the effective radar cross section of augmentation system 10 be maximized.

While RF amplifiers with high gain are commercially available, the usable gain is limited by the isolation between transmitting antenna 16 and receiving antenna 12, which (as depicted in FIG. 1) are required to be in close proximity due to physical constraints of the host vehicle. The coupling between antennas 12 and 16 provides an RF signal feedback path 24 whereby the signal transmitted by the transmitting antenna 16 of system 10 is captured by the receiving antenna 12 of system 10, amplified and re-radiated, along with the desired radar signal component from the RF signal 22 from the guidance system of the missile tracking the host vehicle. The resulting signal from finite antenna isolation recirculates through augmentation system 10 producing regenerative oscillations which can render augmentation system 10 ineffective.

Referring now to FIGS. 2, 3A, 3B, and 4, a microwave switch 26 may be inserted in augmentation system 10 to increase the effective antenna isolation by alternately enabling and disabling the augmentation system 10. The timing of the switch 26 is determined by the difference between the time delays of feedback path 24 and the intrinsic time delay between transmission of signal 20 by transmitting antenna 16 and the reception of signal 22 by receiving antenna 12. Augmentation system 10 is turned off during the time when the transmitted signal normally re-enters receiver 12. Turning off receiver 12 precludes reception of transmissions from transmitter 16 coupled through signal feedback path 24 to receiver 12.

Figure 2:
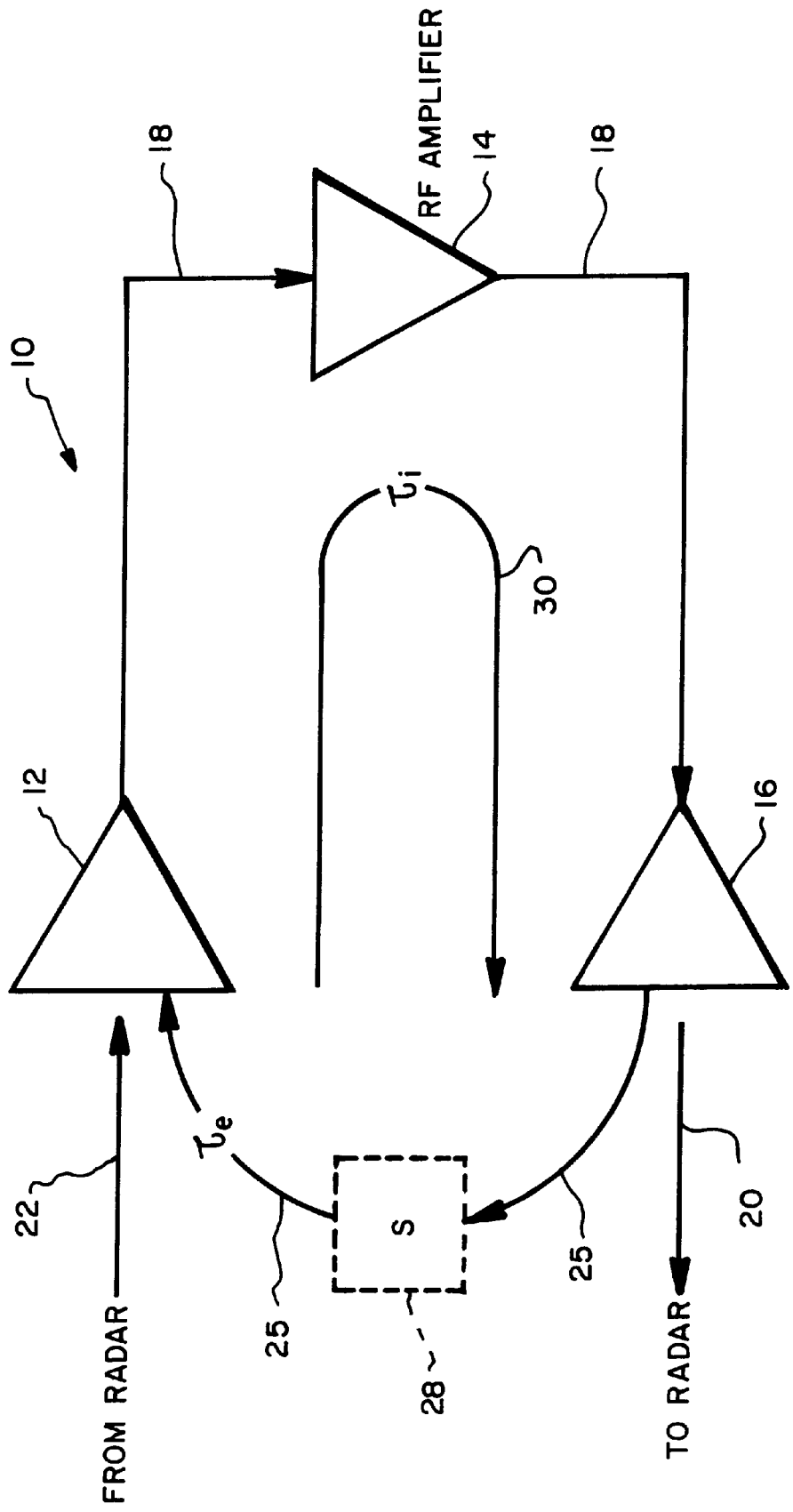
FIG. 2 is a circuit diagram illustrating the augmentation system of FIG. 1 including a feedback path which results in spurious responses being generated by the system.

Referring to FIGS. 2, 3A, and 36, the operation of augmentation system 10 in the absence of switch 26 is described with reference to FIG. 2 in which the antenna isolation is indicated by block 28 (illustrated in phantom). Block 28 represents a coupling factor S, an internal time delay $\tau_e$ (represented by arrows 25, FIG. 2) and an external time delay $\tau_i$ (represented by arrows 30, FIG. 2).

The response of the augmentation system to an RF pulse 32 (FIG. 3B) applied to the input of receiving antenna 12 consists of an amplified replica of the input signal delayed by the time delay $\tau_e$ followed by successive repetitions of the input delayed by multiples of $\tau_i$.

The desired response of augmentation system 10 is represented by the first output pulse 34 of FIG. 3B. Pulse 34, in turn, is amplified by G (the product of the gains of amplifier 10 and antennas 12 and 16) and delayed by the internal time delay $\tau_i$. Pulses 36 and 38 of FIG. 3B are spurious responses to pulse 32 of FIG. 3A caused by antenna leakage signals recirculating through augmentation system 10.

Referring to FIG. 3B, pulse 36 occurs at a time $2\tau_i+\tau_e$ and pulse 38 occurs at a time $3\tau_i+2\tau_e$. The magnitude of pulse 36 is the product of $G^2S$ while the magnitude of pulse 38 is the product of $G^3S^2$.

As the isolation between antennas 12 and 16 is increased (coupling will decrease), the magnitude of the spurious responses including pulse 36 and 38 will decrease. For an infinite isolation, the augmentation system output consists of an amplified, delayed RF signal 20 of the received RF signal 22. The occurrence of spurious responses such as pulses 36 and 38 due to recirculating leakage components is undesirable because the effective RCS of the augmentation system 10 exhibits periodic frequency variations caused by constructive and destructive interference between the various time-delayed responses of FIG. 3B.

The limiting condition as the isolation between antennas 12 and 16 decreases occurs when the second pulse 36 and successive pulses including pulse 38 have the same magnitude as the first pulse 34 of FIG. 3B, which indicates an unstable response. System stability is provided by insuring that the gain exceeds the isolation, which is given by the expression:

$$GS<1 \qquad (2)$$

The maximum usable gain and the maximum achievable radar cross section are constrained by the available antenna coupling.

Referring to FIGS. 4 and 5A–5E, FIG. 4 illustrates augmentation system 10 with microwave switch 26 included therein. Specifically, FIGS. 5A–5E show responses for augmentation system 10 using the micro wave switch 26 when the input signal to receiving antenna 12 is a continuous signal (FIG. 5A). As depicted in FIGS. 5B and 5C, the timing signal to switch 26 is adjusted to have switch 26 in the open state (FIG. 5B) during a time period when the coupling signal (FIG. 5E) is received by receiving antenna 12. This, in turn, prevents subsequent recirculation of the signal through augmentation system 10, while passing the signal through switch 26 to amplifier 10 as is best illustrated by FIG. 5C.

The timing of the signal (FIG. 5B) to microwave switch 26 can be determined because the time delays are fixed and can be measured. An analysis of the timing indicates that the antenna leakage signal can be eliminated by toggling microwave switch 26 "on" and "off" by using a square wave (FIG. 5B) having on and off times equal to $\tau_e+\tau_i$. Under this condition, the signal coupled by the antenna leakage arrives at the output of receiving antenna 12 while microwave switch 26 is in the open state (FIG. 5B) which results in the signal of FIG. 5C occurring at the output of switch 26.

The signal of FIG. 5C is delayed by the internal time delay $\tau_i$ prior to being transmitted by antenna 16 as is best illustrated by FIG. 5D.

Because the time delays associated with the augmentation system 10 are relatively short, typically less than 10 ns, the frequency of the square wave signal of FIG. 5B can be as high as 100 Mhz. The spectral sidebands induced by the switching process fall outside the bandwidth of all operational radar systems, thus precluding the possibility of interference. Because operational radar receivers will only accept the central spectral line of the modulated signal, however, the power received by the radar is reduced by a factor of four by the 0.5 duty cycle of the switched signal. Effects of the reduced power, however, are compensated for by the higher system gain allowed by the elimination of the antenna coupling signal.

It should be noted that microwave switch 26 may be positioned between the output of amplifier 14 and the input of transmitting antenna 16 without effecting the operation of augmentation system 10.

From the foregoing, it may readily be seen that the present invention comprises a new, unique and exceedingly effective system for increasing isolation in active radar augmentation systems which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. An active radar augmentation system adapted for use in a target to direct a radar guided missile to said target, said active radar augmentation system comprising:

a receiving antenna mounted in said target for receiving radar signals from said radar guided missile;

amplifying means for amplifying said radar signals;

a transmitting antenna connected to said amplifying means for transmitting said radar signals as a return signal to said radar guided missile to guide said radar guided missile to said target, said transmitting antenna being mounted in said target;

switching means for receiving said radar signals and a square wave signal having a predetermined on-off time period, said square wave signal opening and closing said switching means isolating said transmitting antenna from said receiving antenna to prevent a radio frequency feedback signal transmitted by said transmitting antenna from combining with said radar signals received by said receiving antenna;

the return signal from said transmitting antenna having a gain G calculated in accordance with the following equation:

$$G = G_R \cdot A \cdot G_T$$

where $G_R$ is the gain of said receiving antenna, A is the gain of said amplifying means and $G_T$ is the gain of said transmitting antenna.

2. The active radar augmentation system of claim 1 wherein said switching means comprises a microwave switch.

3. The active radar augmentation system of claim 1 wherein said amplifying means comprises a radio frequency amplifier.

4. The active radar augmentation system of claim 1 wherein the return signal from said transmitting antenna is stronger than reflected radar returns from said target.

5. The active radar augmentation system of claim 1 wherein said radar signals comprise radio frequency signals.

6. An active radar augmentation system adapted for use in a target to direct a radar guided missile to said target, said active radar augmentation system comprising:

a receiving antenna mounted in said target for receiving radio frequency signals from said radar guided missile;

a microwave switch connected to said receiving antenna to receive said radio frequency signals;

a radio frequency amplifier connected to said microwave switch, said amplifier amplifying said radio frequency signals; and a transmitting antenna connected to an output of said radio frequency amplifier for transmitting said radio frequency signals as a return signal to said radar guided missile to guide said radar guided missile to said target, said transmitting antenna being mounted in said target;

said microwave switch receiving a square wave signal having a predetermined on-off time period, said square wave signal opening and closing said microwave switch isolating said transmitting antenna from said receiving antenna to prevent a radio frequency feedback signal transmitted by said transmitting antenna from combining with said radio frequency signals received by said receiving antenna; and the return signal from said transmitting antenna having a gain G calculated in accordance with the following equation:

$$G = G_R \cdot A \cdot G_T$$

where $G_R$ is the gain of said receiving antenna, A is the gain of said amplifying means and $G_T$ is the gain of said transmitting antenna.

7. The active radar augmentation system of claim 6 wherein the return signal from said transmitting antenna is stronger than reflected radar returns from said target.

* * * * *